UNITED STATES PATENT OFFICE.

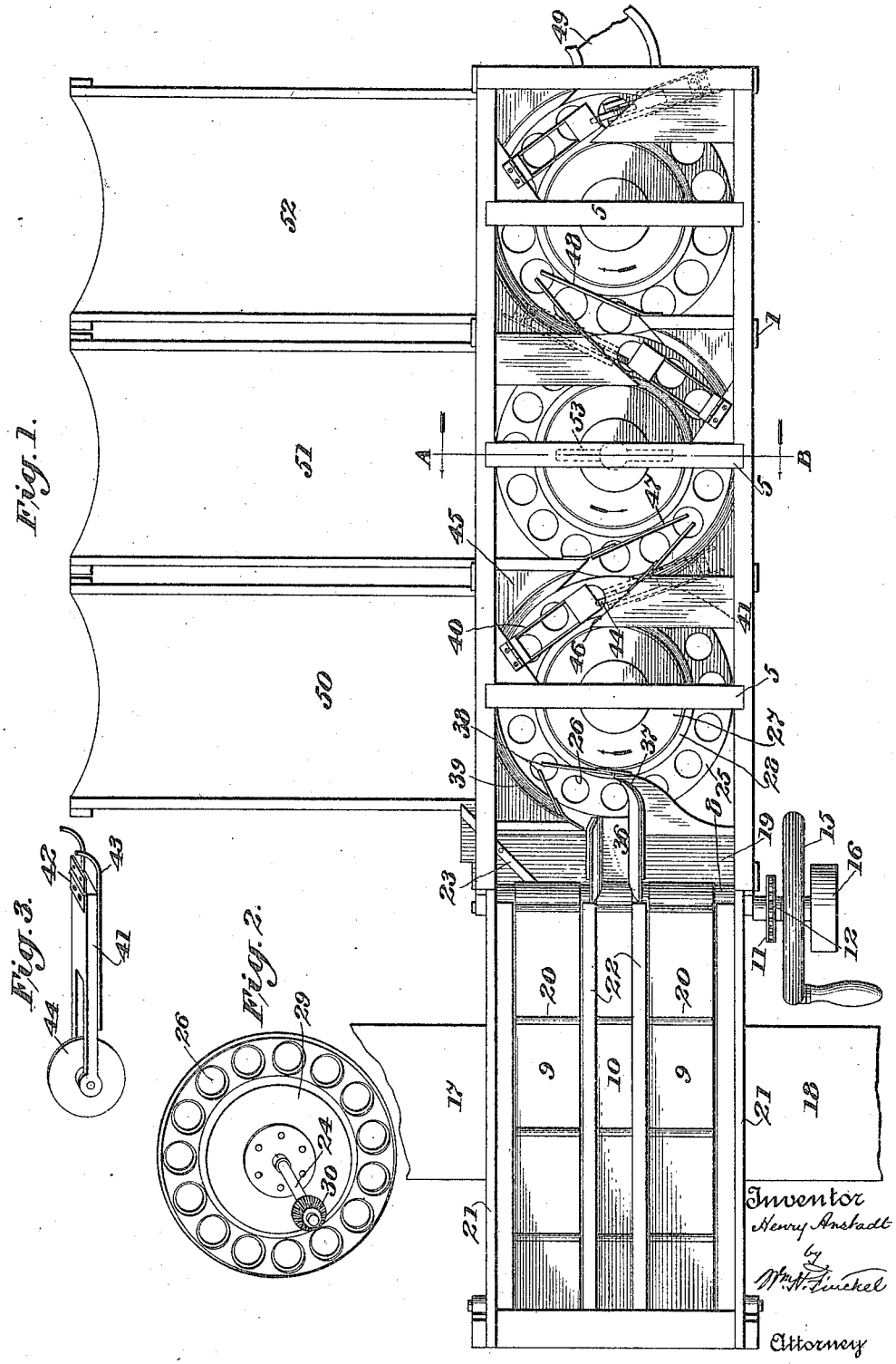

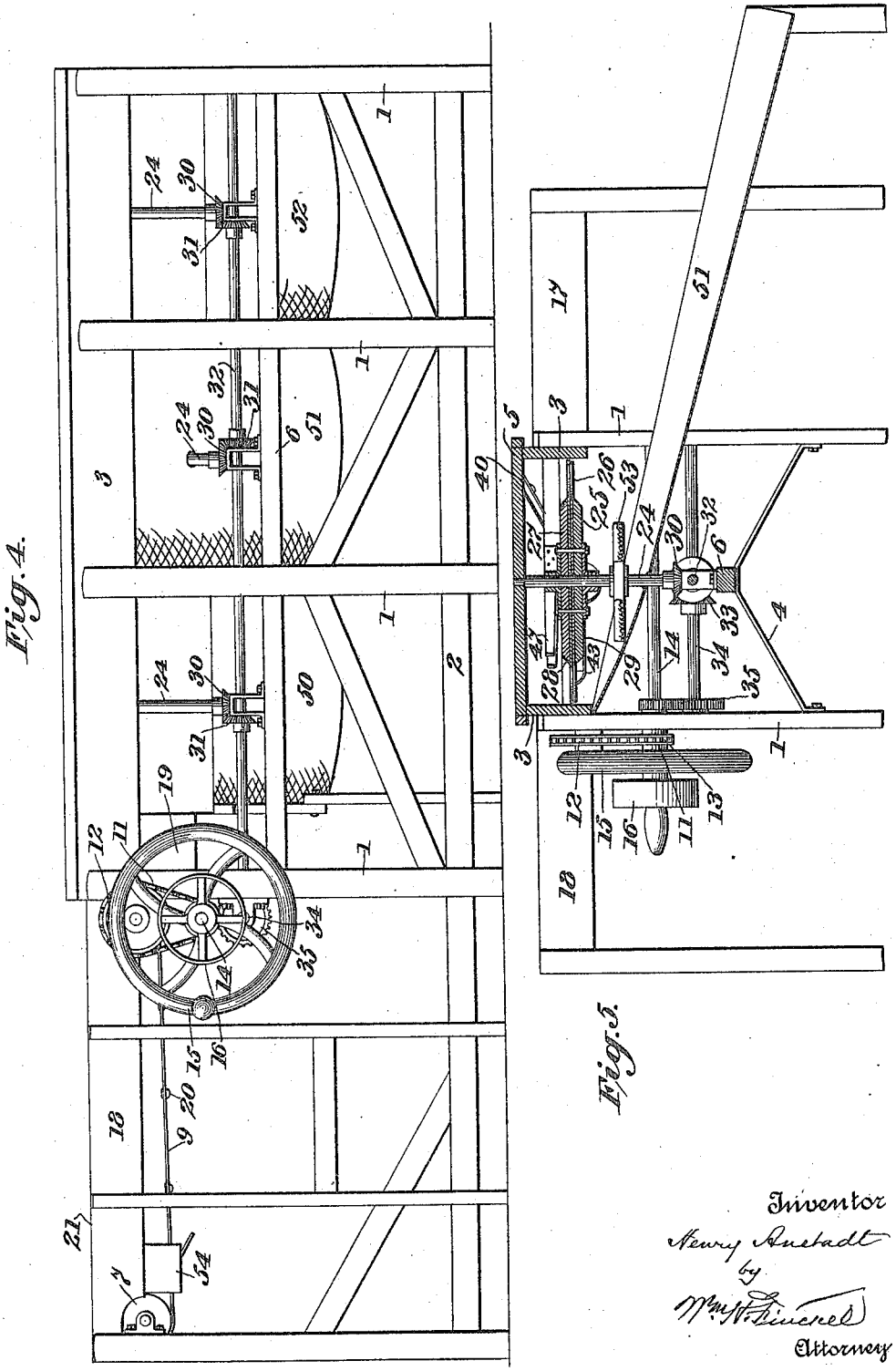

HENRY ANSTADT, OF WASHINGTON, DISTRICT OF COLUMBIA.

FRUIT AND VEGETABLE GRADER.

1,185,039.　　　　　Specification of Letters Patent.　　Patented May 30, 1916.

Application filed June 24, 1915. Serial No. 36,073.

*To all whom it may concern:*

Be it known that I, HENRY ANSTADT, a citizen of the United States, residing at Washington, in the District of Columbia, have invented a certain new and useful Improvement in Fruit and Vegetable Graders, of which the following is a full, clear, and exact description.

The object of this invention is to provide a machine for grading fruits and vegetables into approved or desired sizes and quality more conveniently and with greater accuracy than heretofore, and without bruising them.

The problem of machine-grading fruits and vegetables which are of substantially uniform spherical shape, is comparatively simple, but the proper grading of fruits and vegetables, such as apples, which are more or less irregular in shape, requires a machine of more or less complex construction so far as the number of parts or units is concerned, in order to properly separate the articles into desired sizes. Obviously a machine designed for such work must be practical in character, its units simple in construction so that it will not easily get out of order, strong and durable, and that will operate positively and reliably; and further, it must be capable of acting upon the fruit with the utmost gentleness so as to preclude bruising; and in order to successfully compete with expert manual handling, it must be capable of operating at such speed as to effect the grading faster and more accurately than can be done by hand.

In accordance with the present invention, which is designed to meet the requirements stated, the articles to be graded are manually sorted, and the selected articles are placed upon a moving carrier by which they are delivered to a horizontally rotating perforated disk, and those articles which are of a size to escape through the perforations in this disk are compelled to so escape, and the larger articles are thence delivered to a similar disk with larger perforations through which the articles of next larger size are compelled to escape, and so on to successive disks having progressively larger perforations, and then from the last disk those articles incapable of escaping through its perforations are carefully delivered. Those articles not designed to be graded by the disks are separated by hand and delivered to suitable receptacles, and those articles graded out by the disks fall into suitable chutes whence they are positively delivered to suitable receptacles for packing. Throughout the machine provision is made for movement of the articles with the utmost gentleness in order to avoid bruising them.

The invention consists of a grading machine possessing the characteristics last previously described, and certain structural elements of novelty entering into its construction, as I will proceed now to explain and finally claim.

In the accompanying drawings, illustrating the invention, in the several figures of which like parts are similarly designated, Figure 1 is a top plan view of one emdodiment of my invention. Fig. 2 is an inverted perspective view of one of the disks. Fig. 3 is a perspective view of one of the lifters. Fig. 4 is a side elevation. Fig. 5 is a cross-section taken substantially in the plane of line A B, Fig. 1, and looking to the left.

The frame of the machine may be of any suitable construction, and as here shown comprises the uprights 1, stringers 2 and vertical side walls 3, the uprights being suitably braced if necessary, and the cross-pieces 4 and 5 and the longitudinal beam 6. At one end of the machine is arranged a sorting platform, comprising the horizontally arranged transverse rollers or drums 7 and 8 having bearings in the frame and on which are mounted the flexible endless carriers 9 and 10. Power may be applied to the roller or drum 8 in any suitable way, as by means of a sprocket chain 11, engaging a sprocket 12 on the shaft of roller 8, and a sprocket 13 on the main driving shaft 14, to which power may be applied by hand-wheel 15 or pulley 16. Tables 17 and 18 may be applied at opposite sides of the carriers on which the articles to be graded are placed in bulk and from which they are taken by hand and preliminarily sorted, the choice articles being placed upon carrier 10 to be carried to the grading devices next described, and the other articles placed upon the carriers 9, whence they are delivered to a laterally inclined transverse trough 19 located between and below the delivery mechanism and the grading mechanism, from which they are delivered to any suitable receptacle or receptacles. The carriers 9 and 10 may have the cross-strips 20, to insure the proper discharge of the articles without crowding. That portion of the frame in which the carriers are mounted, may have upwardly extended sides 21, and the three carriers may be separated by the longitudinal walls 22, and the bottom of this portion may be solid or open as desired, or the bottom under the carrier 10 alone may be open. All parts not otherwise soft may be padded, and the carriers themselves are of canvas, rubber or other flexible and non-bruising material. At the discharge end of the trough 19 is a pivoted gate 23, arranged obliquely across it and movable therein so as to properly divert the articles coming into the trough from the carriers 9, either into the receptacle which receives the first grade or into a separate receptacle as may be desired.

On the beam 6 are erected the upright spindles 24, having their upper ends arranged in bearings in the cross-pieces 5. Each spindle has fixed to it one of the horizontally disposed grading disks, all of which are alike excepting as to the size and number of their perforations or grading holes, and a slightly increased speed of rotation to compensate for the number of perforations, and hence a description of one of these disks will suffice for all. I have shown only three such disks, but any number of them may be used in accordance with the number of grades to be secured. The disk 25 may be of any suitable material, padded or otherwise constructed to prevent bruising the articles, and having a circular series of circular perforations 26, adjacent to its periphery, and surmounted by a disk 27, with a beveled and padded edge 28 and supported upon a subjacent disk 29. The grading disks are rotated by any suitable means, such as bevel gears 30 on their spindles engaged by bevel gears 31 on a line shaft 32, mounted upon the beam 6, said line shaft being driven from the main shaft 14, as by gearing 33 connecting it with the countershaft 34, also mounted on the frame and geared as at 35 with the main driving shaft 14. The timing of the driving mechanism should be such that the carriers will be driven at such speed relatively to the revolving disks that the articles will be fed to the disks no faster than they can be disposed of by the disks, thus preventing any crowding of the articles and yet allowing the fruit or vegetables to be fed to the utmost capacity of the revolving disks to care for the articles.

Between the carrier 10 and the next adjacent or first disk is a feed spout 36, inclined downwardly toward the disk and having one side 37 curved laterally so as to insure the delivery of the articles over the line of holes 26 in the disk. Any article not spontaneously falling through these holes at the point of immediate delivery and yet small enough to so fall is retarded by the converging spring fingers 38, and compelled to fall through. These fingers are arranged at opposite sides of the discharge end of the spout and overlie the perforations in the disk and they yield to permit the passage of all articles too large to fall through the perforations and such articles are by these fingers given a tendency to settle in the holes and thus be individually moved forward by the rotating disk. In order to circumscribe the path of the moving article, a padded block 39 is placed in the corner next to the delivery end of the feed trough. After the article leaves the fingers 38, it passes beneath the horizontally pivoted trap 40 of light material and overlying the row of perforations in the disk, the trap being sufficiently light to be lifted by the passing article and then gravitate back to position for the purpose next appearing. Next to this trap and beneath the disk is arranged a spring-pressed lifter comprising a frame 41 hinged to the main frame at 42 and having rearwardly extended springs 43 or other elastic supporting mediums which will tend to hold the free end of the frame up against the bottom of the disk, and this lifter is arranged in the line of the perforations and at its free end is provided with a soft or padded roller 44 the periphery of which extends into the perforations in the disk and tends to eject therefrom any articles that may have stuck in the perforations without falling through them and to return them to the path of travel, the trap then being in position to prevent the thus-ejected article from rolling back, and compelling it to move forward. The corner of the frame next to the trap is likewise provided with a circumscribing padded block 45 and at the opposite side of the frame is a deflector 46 having a slanting edge extending obliquely across the path of the disk and serving to deflect the loose articles from one disk to the next. As the disk rotates, the edges of the perforations strike the lifter roller and press it below the disk so that when the next hole comes opposite the roller, the roller enters it under pressure of the lifter springs and thereby imparts a slight but effective upward pressure against the article lodging in the perforation and dislodges it.

As already stated, the next succeeding disk is of the same construction as that previously described, excepting that its perforations may be larger in diameter and if necessary fewer in number, so as to discharge or sort out the articles of next larger grade. This second disk coöperates with the first disk by slightly underlapping it, and between the two disks at the point of underlapping are interposed the fingers 47 similar in construction and function to the fingers 38. This second disk turns in the opposite direction to the first disk and carries the larger articles around to the trap 40 and the lifter beneath it, and from this second disk the larger articles are carried to a third disk differing from the second disk in the number and size of its perforations and traveling in the same direction as the first disk, or in other words, in a direction opposite to the travel of the second disk, and having the fingers 48 arranged in the same direction as the corresponding fingers 38 at the first disk and also having its trap and lifter arranged as at the first disk. This third disk discharges through its perforations the third grade, and if a fourth or any other number of grades be desired, then they may be had by adding the necessary additional disks, excepting that the largest articles may be discharged from the last disk into a chute or delivery device 49.

The chute 50 for the first disk may be extended under the disk to the far side of the spindle, but the chute 51 of the second disk must be extended clear across to the near side of the frame, and the chute 52 of the third disk will be extended as in the case of the chute 50, and so on alternately. These chutes may be made of any number of parts.

The arrangement of the alternate disks revolving in different directions makes it necessary to provide for a serpentine path of movement of the articles to be graded from a point of entrance into the grading section to a point of discharge, and this insures a progressive feed of the articles and has a tendency to overcome or minimize crowding the articles.

If it be found advisable or desirable to vary the speed of the several disks in accordance with the number of perforations each contains, then this is easily effected by a change gear, connecting its spindle with the line shaft. Whatever driving mechanism is employed, it is advantageous that the carriers shall operate with respect to the disks at such a speed as that the articles will be fed as fast as and no faster than they can be carried away by the revolving disks, and in all cases the speed should be such as to prevent crowding of the articles and yet allow them to be fed to the utmost capacity of the revolving disks to dispose of them either through their perforations or advance them to the next disk or to the end discharge.

In order to overcome any tendency of the articles falling through the perforations of the respective disks to accumulate in the upper end of the chute or around the disk spindle, I prefer to place upon the disk spindles cross-arms 53 having soft non-bruising surfaces, and these cross-arms in the rotation of the spindles serve to sweep the incoming articles away from the upper ends of the chutes and around the spindles and cause them to discharge from the machine.

If desired, the upper end of the sorting section containing the traveling carriers, may be provided with a box 54 (Fig. 4) through which the carriers run, and by which they are guided and kept in proper position on the roller or drum 7, or flanges on the rollers may be used instead of the box.

The capacity of the machine may be doubled, and provision also made for sorting the articles, for example, fruit, into "fancy" (that is to say, fruit perfect in color and shape) and "choice" (that is to say, fruit which is only slightly off color and slightly irregular in shape), by providing an additional series of grading disks arranged in the opposite direction at the upper end of the sorting platform. These and other variations in the construction and arrangement of the constituent elements of the invention are permissible within the scope of the claims hereinafter made.

The operation of the machine will be readily understood from the foregoing, but it may be said here that any desired number of operators may arrange themselves at the feeding tables next to the sorting platform and manually separate the articles to be graded, placing the perfect articles upon the carrier 10 and the imperfect articles upon the carriers 9. The imperfect articles are carried along by the carriers 9 and dropped at once upon the inclined trough 19, and thence delivered to the appropriate receptacle or receptacles, while the perfect articles are carried by the carrier 10 to the feeding spout 36 through which they roll upon the first grading disk in line with its grading perforations. Should any of the articles lodge upon the surface of the disk, instead of immediately settling into the grading holes, they would be retarded and compelled to settle into the perforations by the retarding fingers 38. Those articles having a smaller diameter than that of the perforations will immediately drop through into the chute 50, while all other articles will be carried around under the trap 40 and will be lifted gently out of the perforations even with the upper surface of the disk by means of the lifter roller 44, and directed by means of the deflector 46 upon the next succeeding disk where these grading operations will be repeated, and so on from disk to disk. Articles too large to drop through the holes in any of the disks will be gently carried along from disk to disk until they are delivered by the last deflector over the edge of the last disk into the end pocket, receptacle or chute 49.

What I claim is:—

1. In a grading machine, a traveling feeding carrier, a series of horizontally disposed revolving grading disks to which the articles to be graded are delivered by the feeding carrier, said disks having perforations of different sizes to permit the discharge of articles of corresponding sizes, respectively, and means to operate the carrier and disks coördinately to effect the delivery of the articles to be graded to the grading disks as fast as and no faster than such articles can be carried away by said disks.

2. In a grading machine, a grading mechanism, a feeding mechanism comprising a plurality of carriers one of which delivers the articles to be graded to said grading mechanism, a trough interposed between and below the grading mechanism and feeding mechanism into which trough the articles are discharged from the other carriers, and a gate at the end of said trough for diverting the articles going out of the trough as may be desired.

3. In a grading machine, a frame, a rotary perforated grading disk, means to deliver articles to be graded to said disk, and guides arranged alongside of the perforations and the path of travel of the articles to be graded to keep the articles in alinement.

4. In a grading machine, a revolving perforated grading disk, and an overhanging trap riding over the line of perforations and serving to permit the passage beneath it of the on-moving articles and to prevent the return of such articles.

5. In a grading machine, a series of horizontally disposed rotary perforated grading disks, means to guide the articles to be graded from one disk to another, and a deflector obliquely disposed across the path of movement of the articles at the meeting points of adjacent disks to insure the transfer of the articles from one disk to the other.

6. In a grading machine, a revolving perforated grading disk, and a pivoted spring-impelled lifter having a roller at its free end adapted to enter the perforations in the disk to eject from such perforations any articles too large to pass through them.

7. In a grading machine, a revolving perforated grading disk, combined with a subjacent pivoted ejecting medium having a roller at its free end adapted to enter the perforations in the disk as they are successively moved over it to eject therefrom any articles resting therein for the time being.

8. In a grading machine, having any number of revolving perforated disks, chutes beneath said disks into which the articles escaping through the perforations of the several disks are dropped, and sweeps beneath the disks and within the chutes to compel the articles falling into the chutes to emerge therefrom.

9. In a grading machine, the combination of a carrier, a series of horizontally arranged revolving grading disks having perforations of different sizes to permit the automatic discharge of articles of corresponding sizes respectively, means to rotate said disks and move said carrier in unison, a spout leading from the carrier to the first disk, means to insure the discharge of all articles of the grade to be made by said disk, and means to permit the transfer of the larger articles from one disk to the next succeeding disk and prevent the return of any such articles to the preceding disk, and means to insure the discharge of all of the articles to be graded by said succeeding disk, thereby to effect the successive separation of the next larger articles into grades.

10. In a grading machine, the combination of a carrier, a series of horizontally arranged revolving grading disks having perforations of different sizes to permit the automatic discharge of articles of corresponding sizes respectively, means to rotate said disks and move said carrier in unison, a spout leading from the carrier to the first disk, means to insure the discharge of all articles of the grade to be made by said disk, and means to permit the transfer of the larger articles from one disk to the next succeeding disk and prevent the return of any such articles to the preceding disk, and means to insure the discharge of all of the articles to be graded by said succeeding disk, thereby to effect the successive separation of the larger articles into grades, the path of movement of the articles from one disk to another being sinuous.

11. In a grading machine, the combination of a carrier, a series of horizontally arranged revolving grading disks having perforations of different sizes to permit the automatic discharge of articles of corresponding sizes respectively, means to rotate said disks and move said carrier in unison, a spout leading from the carrier to the first disk, means to insure the discharge of all articles of the grade to be made by said disk, and means to permit the transfer of the larger articles from one disk to the next succeeding disk and prevent the return of any such articles to the preceding disk and to insure the discharge of all of the articles to be graded by the succeeding disk, thereby to effect the successive separation of the larger articles into grades, the disks alternately operating in opposite directions and the path of movement of the articles to be graded being sinuous from disk to disk.

12. In a grading machine, the combination of a carrier, a series of horizontally arranged revolving grading disks having perforations of different sizes for the automatic escape of articles of corresponding sizes respectively, means to rotate said disks and move said carrier in unison, a spout leading from the carrier to the first disk, means to insure the discharge of all articles of the grade to be made by said disk, means to effect the transfer of the larger articles from one disk to the next succeeding disk and prevent the return of any such articles to the preceding disk and to insure the discharge of all of the articles to be graded by said succeeding disk, thereby to effect the successive separation of the larger articles into grades, the disks alternately operating in opposite directions and the path of movement of the articles to be graded being sinuous from disk to disk, and guides flanking the path of movement of the articles through the machine.

In testimony whereof I have hereunto set my hand this 23d day of June A. D. 1915.

HENRY ANSTADT.

Witnesses:
 Wm. H. Finckel,
 W. H. Finckel, Jr.

Copies of this patent may be obtained for five cents each, by addressing the "Commissioner of Patents. Washington, D. C."